(12) United States Patent
Kohen et al.

(10) Patent No.: US 8,997,240 B1
(45) Date of Patent: *Mar. 31, 2015

(54) GENERATING USER AUTHENTICATION CHALLENGES BASED ON SOCIAL NETWORK ACTIVITY INFORMATION

(75) Inventors: Javier Kohen, Cracow (PL); Jessica Staddon, Redwood City, CA (US); Andrew M. Archer, San Francisco, CA (US); Madukar Narayan Thakur, San Jose, CA (US); Michael Christopher Hearn, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,535

(22) Filed: Oct. 31, 2011

Related U.S. Application Data

(63) Continuation-in-part of application No. 13/239,026, filed on Sep. 21, 2011.

(51) Int. Cl.
*G06F 21/00* (2013.01)
*G06F 21/31* (2013.01)

(52) U.S. Cl.
CPC ............................... *G06F 21/31* (2013.01)
USPC ............................................. 726/26; 713/182

(58) Field of Classification Search
USPC ........................................ 713/182, 26; 726/26
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,188,253 B2 | 3/2007 | Halasz et al. | |
| 7,278,028 B1 | 10/2007 | Hingoranee | |
| 7,360,248 B1 | 4/2008 | Kanevsky et al. | |
| 7,366,990 B2 | 4/2008 | Pitroda | |
| 7,373,137 B2 | 5/2008 | Lauridsen et al. | |
| 7,555,110 B2 | 6/2009 | Dolan et al. | |
| 7,610,287 B1 | 10/2009 | Dean et al. | |
| 7,742,468 B2 | 6/2010 | Vagelos | |
| 7,802,290 B1 | 9/2010 | Bansal | |

(Continued)

FOREIGN PATENT DOCUMENTS

WO     WO0279984     10/2002

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Christopher Brown
(74) *Attorney, Agent, or Firm* — Patent Law Works LLP

(57) ABSTRACT

A system and method for generating user authentication challenges based at least in part on an account owner's social network activity information. A login request including an account owner's correct username and password as well as additional login information is received from a user. The login attempt is detected as a potentially fraudulent based on the additional login information from the user. The account owner's social network activity information is analyzed. An authentication challenge based at least in part on the account owner's social network activity information is generated and sent for display. The login request is allowed or denied based on the completion on the authentication challenge.

26 Claims, 8 Drawing Sheets

(56) References Cited

U.S. PATENT DOCUMENTS

| | | | |
|---|---|---|---|
| 7,945,950 | B2 | 5/2011 | Nanda et al. |
| 2002/0137490 | A1 | 9/2002 | Gallant |
| 2002/0143874 | A1 | 10/2002 | Marquette et al. |
| 2004/0189441 | A1* | 9/2004 | Stergiou .................. 340/5.51 |
| 2004/0215793 | A1 | 10/2004 | Ryan et al. |
| 2004/0258220 | A1 | 12/2004 | Levine et al. |
| 2005/0152521 | A1 | 7/2005 | Liljestrand |
| 2006/0005020 | A1 | 1/2006 | Hardt et al. |
| 2006/0005263 | A1 | 1/2006 | Hardt et al. |
| 2006/0021009 | A1 | 1/2006 | Lunt |
| 2006/0026288 | A1 | 2/2006 | Acharya et al. |
| 2006/0077957 | A1 | 4/2006 | Reddy et al. |
| 2006/0156385 | A1 | 7/2006 | Chiviendacz et al. |
| 2006/0206604 | A1 | 9/2006 | O'Neil et al. |
| 2006/0286965 | A1 | 12/2006 | Lauridsen et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0234408 | A1 | 10/2007 | Burch et al. |
| 2007/0248077 | A1 | 10/2007 | Mahle, Jr. et al. |
| 2007/0250920 | A1 | 10/2007 | Lindsay |
| 2008/0056475 | A1 | 3/2008 | Brannick et al. |
| 2008/0066165 | A1 | 3/2008 | Rosenoer |
| 2008/0102791 | A1 | 5/2008 | Lauridsen et al. |
| 2008/0103972 | A1 | 5/2008 | Lanc |
| 2008/0148366 | A1 | 6/2008 | Wahl |
| 2008/0192656 | A1 | 8/2008 | Vagelos |
| 2009/0248434 | A1 | 10/2009 | Pfeffer et al. |
| 2009/0259588 | A1 | 10/2009 | Lindsay |
| 2009/0320101 | A1 | 12/2009 | Doyle et al. |
| 2010/0010826 | A1 | 1/2010 | Rosenthal et al. |
| 2010/0107225 | A1 | 4/2010 | Spencer et al. |
| 2010/0131409 | A1 | 5/2010 | Lawyer et al. |
| 2010/0218111 | A1 | 8/2010 | Mitchell et al. |
| 2010/0293601 | A1 | 11/2010 | Schultz et al. |
| 2011/0098156 | A1 | 4/2011 | Ng et al. |
| 2012/0214442 | A1* | 8/2012 | Crawford et al. ............. 455/411 |
| 2012/0304260 | A1* | 11/2012 | Steeves et al. .................... 726/5 |
| 2013/0047149 | A1 | 2/2013 | Xu et al. |

OTHER PUBLICATIONS

Cohen et al., "Social Networks for Creative Collaboration," C&C '05, Apr. 12-15, 2005, pp. 252-255, London, United Kingdom.

Heer et al., "Vizster: Visualizing Online Social Networks," University of California, Berkeley, 8 pgs.

MediaSift Ltd., DataSift: Realtime Social Data Mining Platform, Curate and Data Mine the Real Time Web with DataSift, Dedipower, Managed Hosting, May 13, 2011, 1 pg.

Murchu et al., "Online Social and Business Networking Communities," Digital Enterprise Research Institute DERI Technical Report, National University of Ireland, Aug. 8, 2004, 22 pgs.

Nishigaki et al., "A User Authentication Based on Personal History—A User Authentication System Using E-mail History" Systemics, Cybernetics and Informatics, Transactions of Information Processing Society of Japan, 2006, vol. 4, No. 2, pp. 18-23.

Nosseir et al., "Internet Authentication Based on Personal History—A Feasibility Test" Proceedings of Customer Focused Mobile Services Workshop at WWW, 2005, 6 pgs.

Rao, Facebook Implements Social Captchas for Data Downloads, Internet, retrieved at techcrunch.com/2010/facebook-implements-social-captchas-for-data-downloads, Apr. 9, 2011, 5 pgs.

Singh et al., "CINEMA: Columbia InterNet Extensible Multimedia Architecture," Department of Computer Science, Columbia University, pp. 1-83.

Superfeedr Track, Internet, retrieved at http://blog.superfeedr.com/track/dfilter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

"The Blue Moon Authentication System," Internet, retrieved at http://www.ravenwhite.com/iforgotmypassword.html, Mar. 27, 2012, 5 pages.

Boyd, et al., "Social Network Sites: Definition, History, and Scholarship," Journal of Computer-Mediated Communication, International Communication Association, 2008, pp. 210-230.

Brainard et al., "Fourth-Factor Authentication: Somebody You Know," CCS '06, Oct. 30-Nov. 3, 2006, 11 pages.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

"Gwap", Internet, retrieved at http://www.gwap.com/gwap, Mar. 27, 2012, 1 page.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pages.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

(56) References Cited

OTHER PUBLICATIONS

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "Cinema: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

Mannan, Mohammed, et al; "Localization of Credential Information to address Increasingly Inevitable Data Breaches", NSPW '08: Proceedings of the 2008 Workshop on New Security Paradigms; Aug. 2009, pp. 13-21.

O'Gorman, L.; "Comparing Passwords, Tokens, and Biometrics for User Authentication"; Proceedings of the IEEE; vol. 91, Issue: 12; Digital Object Identifier; 10.1109/JPROC.2003.819611; Publication Year: 2003, pp. 2021-2040.

Yardi et al., "Photo-Based Authentication Using Social Networks", WOSN'08, Seattle, Washington, Aug. 2008, ACM 978-1-60558-182-Aug. 8, 2008, pp. 55-59.

Brostoff et al., "Are Passfaces More Usable than Passwords?," A Field Trail Investigation, IN Proc, HCI, Springer, Sep. 2000, pp. 1-20.

Dhamija et al., "Deja Vu: A User Study Using Images for Authentication," 9th Usenix Security Symposium, Aug. 2000, 14 pages.

Rao, "Facebook Implements Social Captchas for Data Downloads," Internet, retrieved at http://techcrunch.com/2010/10/06/facebook-implements-social-captchas-for-data-downloads/, Oct. 6, 2010 5 pages.

Nishigaki, "A User Authentication Based on Personal History," Transactions of Information Processing Society of Japan, Systems, Cybernetics and Informatics, vol. 5, No. 2, 2006, pp. 18-23.

Nossier et al., "Internet Authentication Based on Personal History—A Feasibility Test," Proceedings of Customer Focused Mobile Services Workshop at WWW, 2005, 6 pages.

Imam, Ali, Visualize Your LinkedIn Network with InMaps (http://blog.linkedin.com/2011/01/24/linkedin-inmaps/), Jan. 24, 2011.

* cited by examiner

GENERATING USER AUTHENTICATION CHALLENGES BASED ON SOCIAL NETWORK ACTIVITY INFORMATION

This application is a continuation-in-part of U.S. application Ser. No. 13/239,026 filed Sep. 21, 2011 and entitled "Generating Authentication Challenges Based on Social Network Activity Information."

The specification relates to online user authentication. In particular, the specification relates to generating user authentication challenges, specifically, generating a user authentication challenge based at least in part on an account owner's social network activity information in response to detecting a potentially fraudulent login attempt.

BACKGROUND

Many websites provide the capability for users to login to view their personal information, or other information that the user wants to keep private, or even access the functionality provided by the website. Oftentimes, an added level of security is established by generating a challenge to a user attempting to login. Most commonly the challenge is the generation of a secret question or the generation of a Completely Automated Public Turing test to tell Computer and Humans Apart (CAPTCHA) to guard against possible fraudulent login attempts, and login by bots and other automated devices. Additional techniques exist to challenge the user, including those based on the user's ability to identify the chronology of calendar activities (recalling appointment times) or e-mails (identifying e-mails as new or old). However, the existing authentication challenge technologies do not utilize the account owner's social network activity information to generate a challenge that is both secure, i.e., not easily completed by a fraudulent user, and imposes minimal burden to a non-fraudulent user, i.e., the account owner can quickly, easily, and successfully complete the authentication challenge.

SUMMARY

The deficiencies and limitations of the prior art are overcome at least in part by providing a system and method for generating a user authentication challenge based at least in part on an account owner's social network activity information in response to detecting a potentially fraudulent login attempt. A system for generating a user authentication challenge based at least in part on the account owner's social network activity information in response to detecting a potentially fraudulent login attempt, the system comprising: a login receiver for receiving a login request, wherein the login request includes an account owner's correct username and password and additional login information from a user; a fraudulent login detection engine for detecting a potentially fraudulent login based on the additional login information from the user; a social network activity information analysis engine for analyzing the account owner's social network activity information; and a challenge generation engine for generating an authentication challenge based at least in part on the account owner's social network activity information and sending the authentication challenge for display.

A method for generating user a authentication challenge based at least in part on an account owner's social network activity information in response to detecting a potentially fraudulent login attempt is also provided. A login request including an account owner's correct username and password and additional login information is received from a user. The login request is identified as a potential fraudulent login attempt based on the additional login information from the user. The account owner's social network activity information is analyzed. An authentication challenge based at least in part on the account owner's social network activity information is generated and sent for display.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
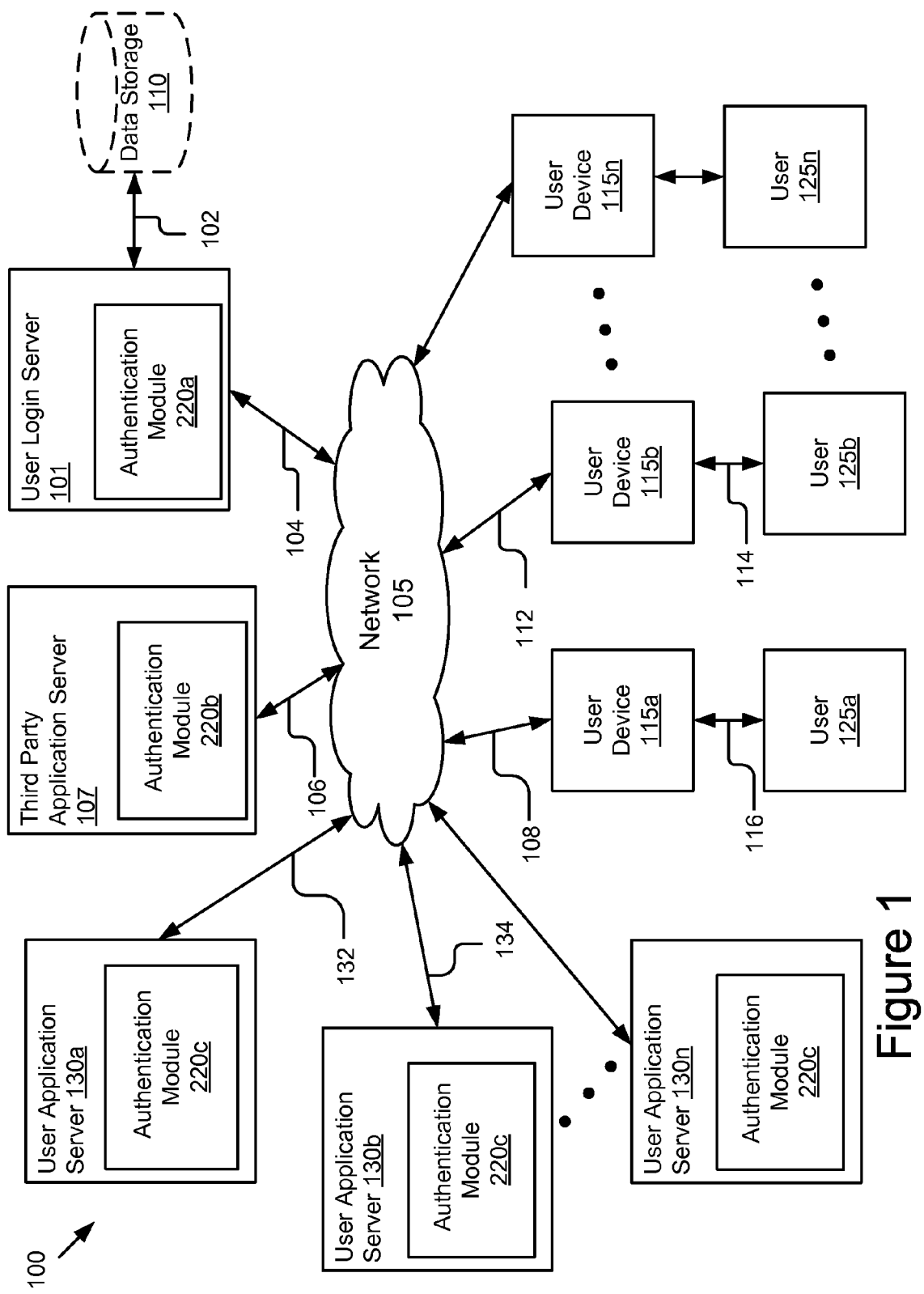
FIG. 1 illustrates a block diagram of a system for generating a user authentication challenge based at least in part on the account owner's social network activity information in response to detecting a potentially fraudulent login attempt according to one embodiment.

A system and method for generating user authentication challenges based at least in part on the account owner's social network activity information in response to detecting a potentially fraudulent login attempt is described. In the following description, for purposes of explanation, numerous specific details are set forth in order to provide a thorough understanding. It will be apparent, however, to one skilled in the art that the embodiments disclosed can be practiced without these specific details. In other instances, structures and devices are shown in block diagram form in order to avoid obscuring the embodiments. For example, one embodiment is described below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, one embodiment can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems appears from the description below. In addition, the present embodiments are not described with reference to any particular programming language. It will be appreciated that a variety of programming languages may be used to implement the teachings as described herein.

System Overview

FIG. 1 illustrates a block diagram of a system 100 for generating a user authentication challenge based at least in part on the account owner's social network activity information in response to detecting a potentially fraudulent login attempt according to one embodiment.

The illustrated embodiment of the system 100 for generating a user authentication challenges based at least in part on the account owner's social network activity information in response to detecting a potentially fraudulent login attempt includes user devices 115a, 115b, and 115n that are accessed by users 125a, 125b, and 125n a user login server 101 and a third party server 107. The system 100 also includes user application servers 130a, 130b, and 130n. In the illustrated embodiment, these entities are communicatively coupled via a network 105. Although only three devices are illustrated, persons of ordinary skill in the art will recognize that any number of user devices 115n are available to any number of users 125n. Furthermore, although only three user application servers 130a, 130b, and 130n are illustrated, persons of ordinary skill in the art will recognize that any number of user application servers 130n may be included.

The user devices 115a, 115b, and 115n in FIG. 1 are used by way of example. While FIG. 1 illustrates three devices, the present embodiment applies to any system architecture having one or more user devices and one or more user application servers. Furthermore, while only one network 105 is coupled to the user devices 115a, 115b, and 115n the user login server 101 and the third party server 107, in practice any number of networks 105 can be connected to the entities. Furthermore, while only one third party application server 107 is shown, the system 100 could include one or more third party application servers 107.

The network 105 enables communications between user devices 115a, 115b, and 115n, the user login server 101, the third party application server 107, and user application servers 130a, 130b, and 130n. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wire line or wireless (i.e., terrestrial—or satellite-based transceivers). In one embodiment, the network 105 is an IP-based wide or metropolitan area network.

In some embodiments, the network 105 helps to form a set of online relationships between users 125a, 125b, and 125n, such as provided by one or more social networking systems. In one embodiment, system 100 is such a social networking system including explicitly-defined relationships and relationships implied by social connections with other online users, where the relationships form a social graph. In some examples, the social graph can reflect a mapping of these users and how they are related.

In one embodiment, an authentication module 220a is included in the user login server 101 and is operable on the user login server 101. In another embodiment, the authentication module 220b is included in the third party application server 107 and is operable on a third party application server 107. In yet another embodiment, the authentication module 220c is included in the user application server 130a/130b/130n and is operable on the user application server 130a/130b/130n. Persons of ordinary skill in the art will recognize that the authentication module 220 can be included and is operable in any combination on the devices 115a, 115b, and 115n and servers 101, 107, 130a, 130b and 130n. In some embodiments the authentication module 220a/220b/220c includes multiple, distributed modules that cooperate with each other to perform the functions described below. Details describing the functionality and components of the authentication module 220a of the user login server 101 are explained in further detail below with regard to FIG. 3.

In the illustrated embodiment, the user devices 115a, 115b are coupled to the network 105 via signal lines 108 and 112, respectively. The user 125a is communicatively coupled to the user device 115a via signal line 116. Similarly, the user 125b is communicatively coupled to the user device 115b via signal line 114. The third party application 107 is communicatively coupled to the network 105 via signal line 106. The user login server 101 is communicatively coupled to the network 105 via signal line 104. In one embodiment, the user login server 101 is communicatively coupled to data storage 110 via signal line 102.

In one embodiment, data storage 110 stores data and information of the users 125a, 125b, 125n of the system 100. Such stored information includes user profiles, user login information and other information identifying the users 125a, 125b, 125n of the system 100. Examples of information identifying users includes, but is not limited to, the user's name, contact information, relationship status, likes, interests, links, education and employment, location, etc. In one embodiment, the information stored in data storage 110 also includes user 125a/125b/125n social networking activity information. Social network activity information includes, but is not limited to, data or information regarding user 125a/125b/125n communications, transactions, sharing, social connections, and feature usage within the system 100. Examples of communications data and information that may qualify as social network activity information include, but are not limited to, the subject, content, dates, senders, or recipients of communications. Examples of transactions data and information that may qualify as social network activity information include, but are not limited to, the identity of the buyer/seller, the item(s) purchased/sold, the price(s), total, and the date of the transaction. Examples of sharing data and information that may qualify as social network activity information include, but are not limited to, what was shared, when something was shared, and with whom something is shared. Examples of social connections data and information that may qualify as social network activity information include, but are not limited to, the identity of present, or past, friends, relatives, acquaintances, and frequent contacts. Examples of feature usage data and information that may qualify as social network activity information include, but are not limited to, games played, applications used, photographs tagged, profiles viewed, and search history. In one embodiment, which is discussed below, a storage device 214 (see FIG. 2) is included in the user login server 101 and stores the data and information of users 125a, 125b, 125n of the system 100. In one embodiment, the storage device 214 stores the data and information discussed above in relation to the data storage 110, including the account owners' social network activity information.

In one embodiment, the user device 115a/115b/115n is an electronic device having a web browser for interacting with the user login server 101 via the network 105 and is used by user 125a/125b/125n to access information in the system 100. The user device 115a/115b/115n can be a computing device, for example, a laptop computer, a desktop computer, a tablet computer, a mobile telephone, a personal digital assistant (PDA), a mobile email device, a portable game player, a portable music player, a portable music player, a television with one or more processors embedded therein or coupled thereto or any other electronic device capable of accessing a network. A computing device can also be a server.

Example User Login Server

Figure 2:
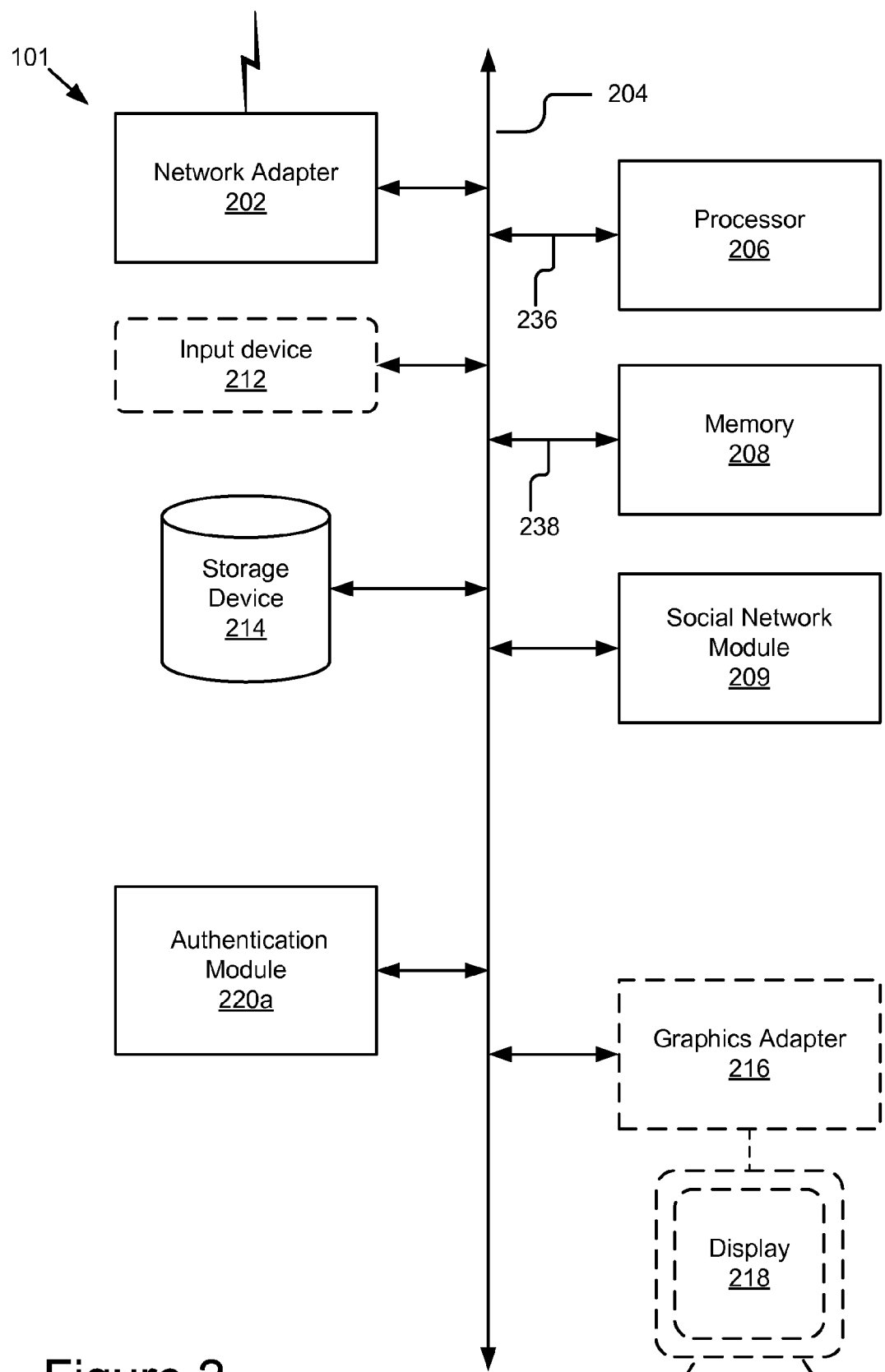
FIG. 2 is a block diagram of an embodiment of a user login server in accordance with one embodiment.

FIG. 2 is a block diagram of an embodiment of a user login server 101 according to one embodiment. As illustrated in FIG. 2, user login server 101 includes a network adapter 202 coupled to a bus 204. According to one embodiment, also coupled to the bus 204 are at least one processor 206, memory 208, a social network module 209, a graphics adapter 216, an input device 212, a storage device 214, and an authentication module 220a. In one embodiment, the functionality of the bus 204 is provided by an interconnecting chipset. The user login server 101 also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the user login server 101. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The user login server 101 also includes an operating system executable by the processor such as but not limited to WINDOWS®, MacOS X, Android, or UNIX® based operating systems. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 208 stores instructions and/or data that may be executed by processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the user login server 101. The memory 208 is coupled to the bus 204 for communication with the other components via signal line 238.

In one embodiment, the user login server 101 contains a social network module 209. Although only one user login server 101 is shown, persons of ordinary skill in the art will recognize that multiple servers may be present. A social network is any type of social structure where the users are connected by a common feature. Examples include, but are not limited to, Orkut, Buzz, blogs, microblogs, and Internet forums. The common feature can include, by way of example, friendship, family, a common interest, work, etc.

The social network module 209 is software and routines executable by the processor 206 to control the interaction between the user login server 101, storage device 214 and the user devices 115a, 115b, and 115n. An embodiment of the social network module 209 allows users 125a, 125b, and 125n of user devices 115a, 115b, and 115n to interact and perform social activities, including social communication, between other users 125a, 125b, and 125n of user devices 115a, 115b, and 115n within the system 100.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 214 is used to store user data and information including the social network activity information of users 125a, 125b, and 125n of the system 100. In other embodiments, such user data and information is stored in data storage 110. In yet other embodiments, the user data and information is distributed and stored between both the storage device 214 and data storage 110.

The input device 212 may include a mouse, track ball, or other type of pointing device to input data into the user login server 101. The input device 212 may also include a keyboard, such as a QWERTY keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the user login server 101 to a local or wide area network.

The authentication module 220a is software and routines executable by the processor 206 to generate a user authentication challenge based at least in part on the account owner's social network activity information in response to detecting a potentially fraudulent login attempt. Specifically, an embodiment of the authentication module 220a is software and routines executable by the processor 206 to receive a login request, including an account owner's correct username and password as well as additional login information from the user; detect a potentially fraudulent login attempt based on the additional login information from the user; analyze the account owner's social network activity information; generate a user authentication challenge based at least in part on the account owner's social network activity information; and send the authentication challenge for display. In one embodiment, the authentication module 220a also determines whether the user successfully completes the authentication challenge. Details describing the functionality and components of the authentication module 220a are explained in further detail below with regard to FIG. 3.

As is known in the art, a user login server 101 can have different and/or other components than those shown in FIG. 2. In addition, the user login server 101 can lack certain illustrated components. In one embodiment, a user login server 101 lacks an input device 212, graphics adapter 210, and/or display 218. Moreover, the storage device 214 can be local and/or remote from the user login server 101 (such as embodied within a storage area network (SAN)).

As is known in the art, the user login server 101 is adapted to execute computer program modules for providing functionality described herein. As used herein, the term "module" refers to computer program logic utilized to provide the specified functionality. Thus, a module can be implemented in hardware, firmware, and/or software. In one embodiment, modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Example Authentication Module

Figure 3:
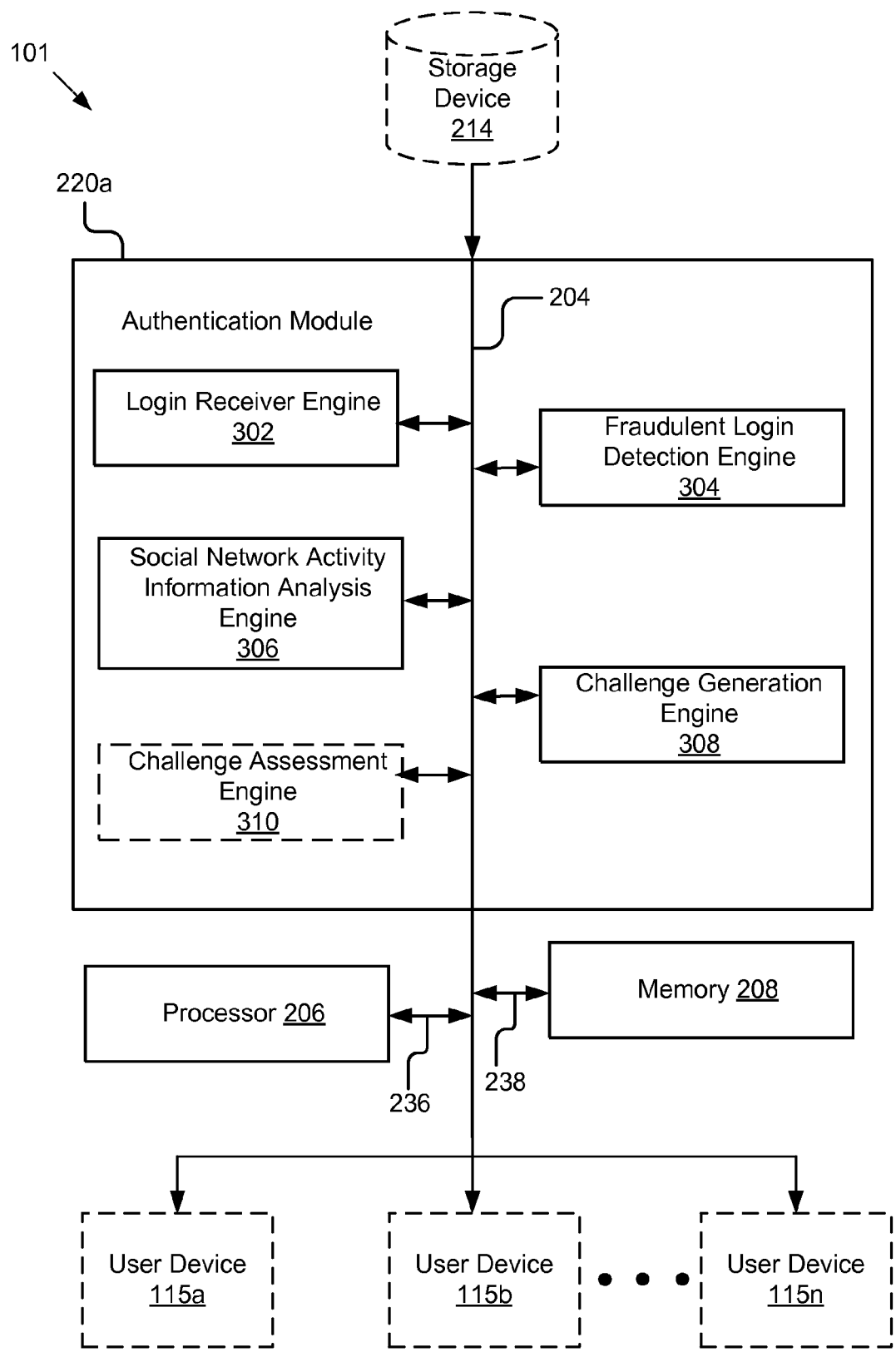
FIG. 3 is a block diagram illustrating an authentication module according to one embodiment.

Referring now to FIG. 3, the authentication module 220a is shown in more detail. FIG. 3 is a block diagram of a portion of the user login server 101 that includes the authentication module 220a, a processor 206 and a memory 208, along with other modules and components recited in the description of FIG. 2. In another embodiment, the third party application server 107 includes the authentication module 220*b*. In yet another embodiment, the user application server 130*a*/130*b*/130*n* includes the authentication module 220*c*. In one embodiment, the authentication module 220*a* is software and routines executable by the processor 206 to generate user authentication challenges based at least in part on the account owner's social network activity information in response to detecting a potentially fraudulent login attempt. For the purposes of describing the components and functionality of the authentication module 220*a*/220*b*/220*c*, the below description describes the authentication module 220*a*. However, one of ordinary skill in the art will appreciate that the same description is also applicable to the functionality and components of the authentication module 220*b*/220*c*.

In one embodiment, the authentication module 220*a* comprises a login receiver engine 302, a fraudulent login detection engine 304, a social network activity information analysis engine 306, a challenge generation engine 308, and an optional challenge assessment engine 310.

The login receiver engine 302 is software and routines executable by the processor for receiving login requests that include a username, password, and other login information from users 125*a*, 125*b*, 125*n* of user devices 115*a*, 115*b*, 115*n*. In one embodiment, the login receiver engine 302 is a set of instructions executable by the processor 206 to provide the functionality described below for receiving login requests that include a username, password, and other login information from users 125*a*, 125*b*, 125*n* of user device 115*a*, 115*b*, 115*n*. In another embodiment, the login receiver engine 302 is stored in the memory 208 of the user login server 101 and is accessible and executable by the processor 206. In either embodiment, the login receiver engine 302 is adapted for cooperation and communication with the processor 206 and other components of the user login server 101 via bus 204 and network 105.

According to one embodiment, the login receiver engine 302 is communicatively coupled to the storage device 214 via bus 204. The login receiver engine 302 of the authentication module 220*a* is also communicatively coupled by the bus 204 and the network 105 to the user devices 115*a*, 115*b*, and 115*n* in order to receive login requests from the devices 115*a*, 115*b*, and 115*n*.

In one embodiment, if the login request does not include a correct user name and password, the login attempt is denied. In one embodiment, the authentication module 220*a* is used in account recovery for generating an authentication challenge based at least in part on the account owner's social network activity when an account owner has forgotten his, or her, username or password. In one embodiment, if the login request includes a correct username and password, the login request is sent to the fraudulent login detection engine 304.

The fraudulent login detection engine 304 is software and routines executable by the processor 206 for detecting a potentially fraudulent login attempt based on the additional login information included in the login request. In one embodiment, the fraudulent login detection engine 304 is a set of instructions executable by the processor 206 to detect a potentially fraudulent login attempt based on the additional login information included in the login request. In another embodiment, the fraudulent login detection engine 304 is stored in the memory 208 of the user login server 101 and is accessible and executable by the processor 206. In either embodiment, the fraudulent login detection engine 304 is adapted for cooperation and communication with the processor 206 and other components of the user login server 101 via bus 204 and network 105.

Examples of additional login information include, but are not limited to, the IP address of the computer from which the login request is coming, the device identification number of the device being used, and/or the location of the computer from which the login request is coming, including the state and/or country, and browser cookies. In one embodiment, the fraudulent login detection engine 304 detects a potentially fraudulent login by analyzing this additional login information. For example, in one embodiment, if the IP address associated with the login request is an IP address of a "blacklisted" user, or a suspected bot, the fraudulent login detection engine 304 identifies the login as potentially fraudulent. In one embodiment, the fraudulent login detection engine 304 detects a potentially fraudulent login by comparing this additional login information to historical login information of the account owner. For example, in one embodiment, if the login attempt originates from a country, or device, that the user has never attempted to login from, the fraudulent login detection engine 304 identifies the login as potentially fraudulent. In one embodiment, the login is allowed if the login request is not identified as potentially fraudulent. In one embodiment, if the login attempt is identified as potentially fraudulent the account owner's social network activity information is analyzed.

Figure 7:
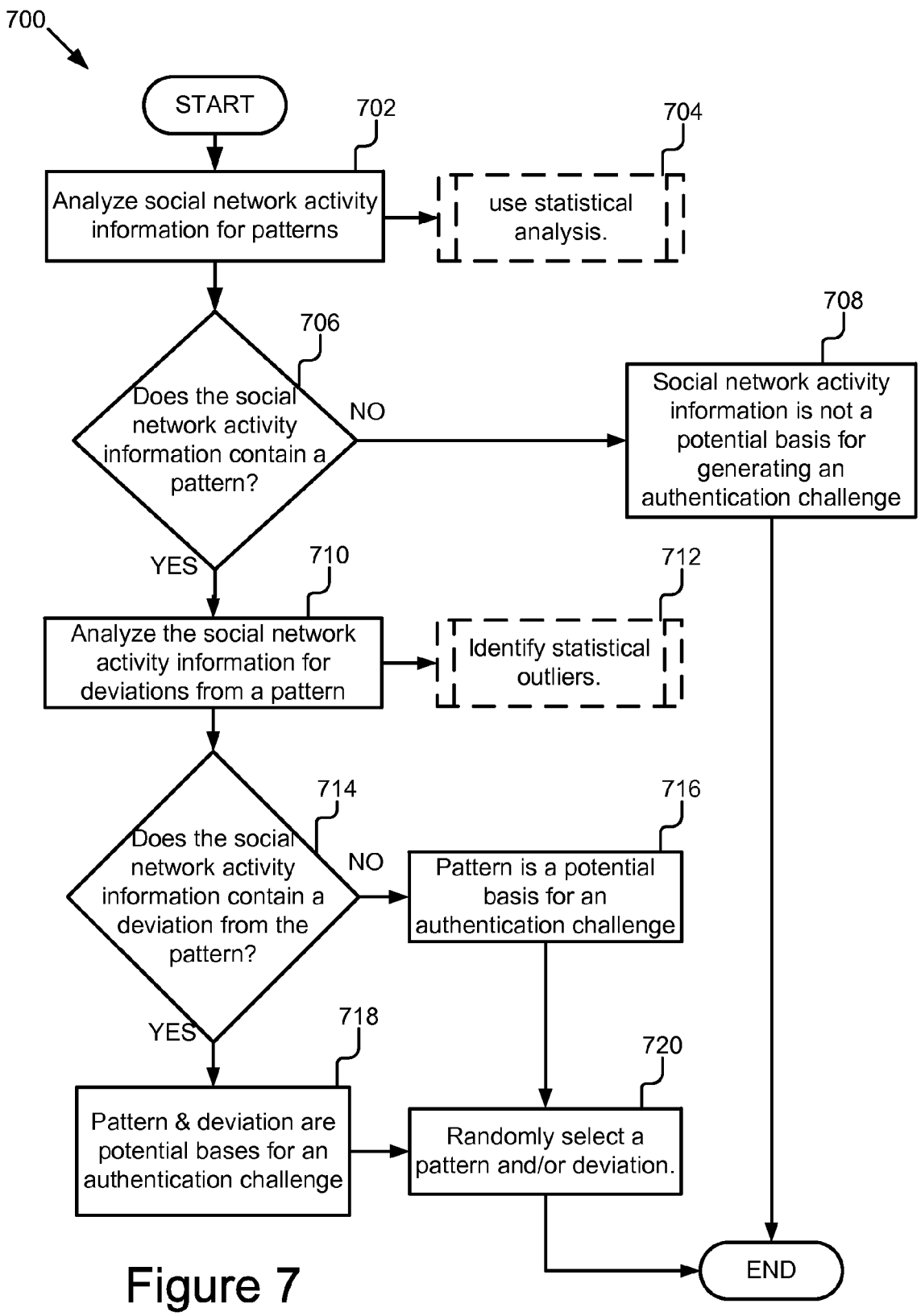
FIG. 7 is a flow chart illustrating a method for analyzing the account owner's social network activity information according to one embodiment.
Figure 8:
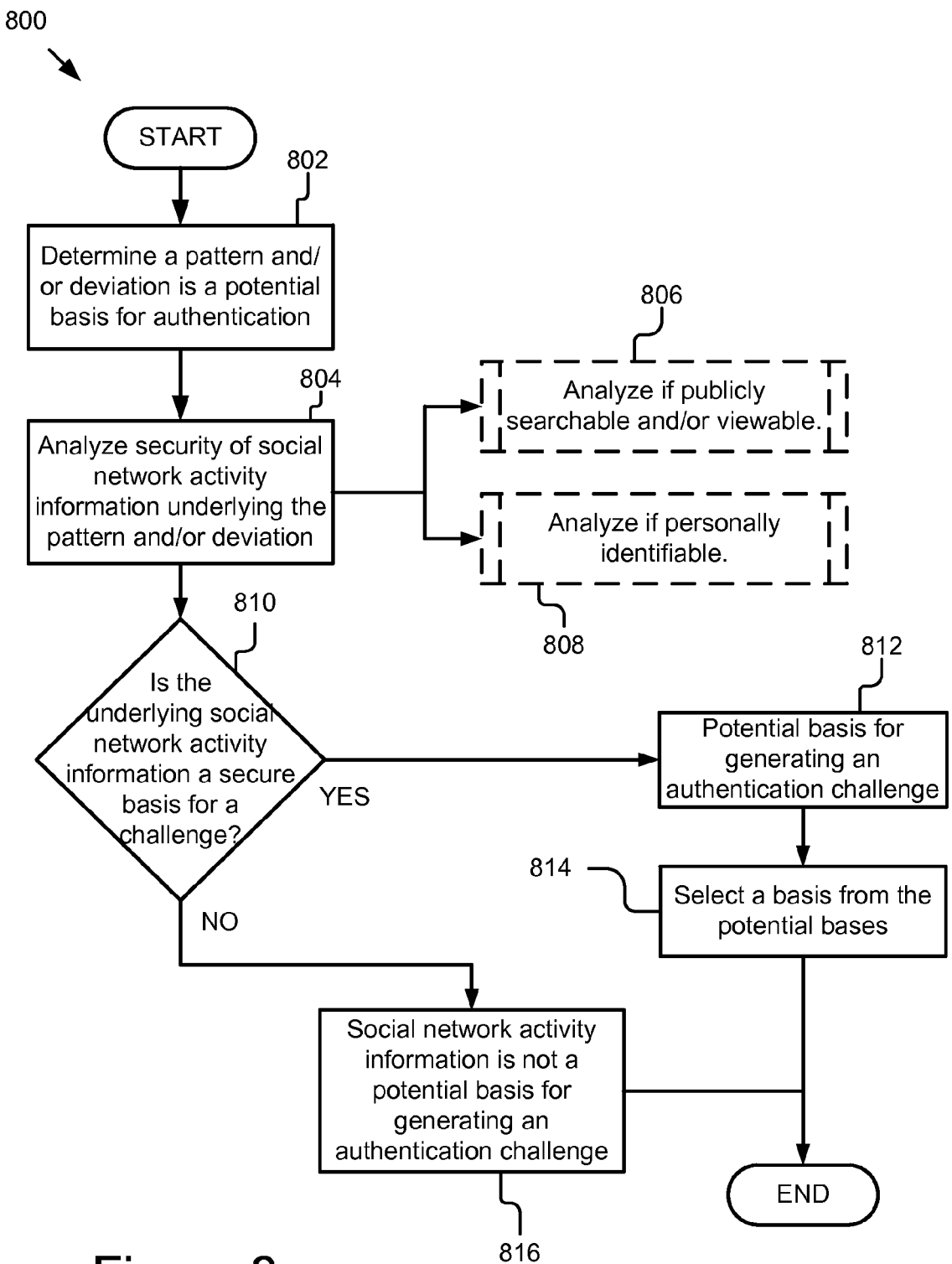
FIG. 8 is a flow chart illustrating a different method for analyzing the account owner's social network activity information according to one embodiment.

The social network activity information analysis engine 306 is software and routines executable by the processor for analyzing the account owner's social network activity information. FIGS. 7 and 8, which are described in more detail below, depict flow charts illustrating different methods for analyzing the account owner's social network activity information according to two embodiments. In one embodiment, the social network activity information analysis engine 306 is a set of instructions executable by the processor 206 to provide the functionality described below for analyzing the account owner's social network activity information. In another embodiment, the social network activity information analysis engine 306 is stored in the memory 208 of the user login server 101 and is accessible and executable by the processor 206. In either embodiment, the social network activity information analysis engine 306 is adapted for cooperation and communication with the processor 206 and other components of the user login server 101 via bus 204 and network 105.

The social network activity information analysis engine 306 analyzes the account owner's social networking activity information. In one embodiment, the social network activity information analysis engine 306 analyzes the account owner's social network activity information for patterns. In one embodiment, the social network activity information analysis engine 306 analyzes the account owner's communications for patterns, for example, regularly writing a message to, or receiving a message from, the same individual. For another example, in one embodiment, the account owner's communications are analyzed to determine the account owner's frequent contacts. In one embodiment, the social network activity information analysis engine 306 analyzes the account owner's feature usage for patterns, for example, identifying that the account owner always removes the tag when tagged in a photograph by a particular friend or is more likely to tag a photograph than message another user. In one embodiment, the social network activity information analysis engine 306 analyzes the account owner's transactions for patterns, for example, if the account owner uses Google Checkout to purchase the same item regularly.

In one embodiment, the social network activity information analysis engine 306 analyzes the account owner's social network activity information for the account owner's deviation from a pattern. In one embodiment, the social network activity information analysis engine 306 analyzes the account owner's social network activity information for a pattern and then analyzes the account owner's social network activity information for deviations from that pattern, e.g., if the account owner rarely comments on photographs, but commented on the same photograph multiple times. In another embodiment, the social network activity information analysis engine 306 analyzes the social network activity information of users 125a, 125b, 125n in general for a pattern and then analyzes the account owner's social network activity information for deviations from that pattern, e.g., identifying that the account owner posts and shares photographs but has never tagged anyone in a photograph when ninety percent of users 125a, 125b, 125n who post and share photographs have tagged someone at least once.

In one embodiment, the social network activity information analysis engine 306 analyzes the social network activity information for content. In one embodiment, the social network activity information analysis engine 306 analyzes the social network activity information for the content of the account owner's communications, for example, the subject line of a message received by the account owner, the content of a private message sent by the account owner, or the status update of the account owner's friend or other social connection. In one embodiment, the content analyzed by the social network activity information analysis engine 306 is sharing activity that is cross product sharing, e.g., identifying to whom the account owner sent a link to the account owner's Picasa album. In one embodiment, the sharing activity may be confined to a single product, for example, sharing a photograph within the social network. In one embodiment, the content analyzed by the social network activity information analysis engine 306 is the account owner's friends or other social connections. In one embodiment, the content analyzed by the social network activity information analysis engine 306 is the contents of the account owner's search history or web cookies.

In some embodiments, the social network activity information analysis engine 306 analyzes the account owner's social network activity information over a long period of time, e.g., the account owner's most frequent contact over the entire duration of the account owner's account. In some embodiments, the social network activity information analysis engine 306 analyzes the account owner's social network activity information over a shorter period of time, e.g., the account owner's most frequent contact in the past week. In one embodiment, the social network activity information analysis engine 306 analyzes the recentness of the account owner's social network activity information.

In one embodiment, the social network activity information analysis engine 306 uses statistics regarding the account owner's data to analyze the account owner's social network activities information. In one embodiment, the statistics regarding the account owner's social network activity information are utilized in the analysis to establish a pattern. In one embodiment, the statistics regarding the account owner's social network activity information are used to determine statistical outliers. In one embodiment, the statistical outliers are social network activity information where the account owner has deviated from a pattern. For example, determining that the account owner spent an unusual amount of money in a particular transaction. For another example, determining if the account owner commented on a thread an unusual number of times.

In one embodiment, the social network activity information analysis engine 306 uses aggregate statistical data of users 125a, 125b, 125n in order to analyze the account owner's social network activity information. In one embodiment, the aggregate statistical data is used to establish the patterns of users 125a,125b, 125n in general for comparison with the account owner's patterns. In one embodiment, the aggregate statistical data is used to determine what social network activity information is personally unidentifiable. In one embodiment, information is personally unidentifiable if the information is common to a large number people. For example, in one embodiment, the subject line "Tonight's game" is personally unidentifiable because it appears in the inbox of over a thousand users. In one embodiment, the account owner's social network activity information is analyzed for social network activity information that is personally unidentifiable. For example, analyzing the subject lines of the account owner's messages for subject lines that also appear in the inbox of one thousand or more users 125a, 125b, 125n.

In one embodiment, the social network activity information analysis engine 306 analyzes the account owner's social network activity information to determine what social network activity information can serve as the basis of a secure authentication challenge. In one embodiment, patterns serve as the basis of a secure authentication challenge. For example, it would be difficult for a fraudulent user to know, or deduce, the account owner's most frequent contact has been over the entire duration account. In one embodiment, social network activity information that is not publicly searchable is the basis of a secure authentication challenge. In one embodiment, social network activity information that is not publicly viewable is the basis of a secure authentication challenge, e.g., the subject, content, or recipient of an account owner's private message. In one embodiment, social network activity information that is personally unidentifiable is the basis of a secure authentication challenge. For example, selecting the personally unidentifiable subject line that appears in the account owner's inbox out of a plurality of personally unidentifiable subject lines, in one embodiment, is a secure authentication challenge. In one embodiment, social network activity information that is cross-product is the basis of a secure authentication challenge.

The challenge generation engine 308 is software and routines executable by the processor 206 for generating authentication challenges based at least in part on the account owner's social network activity information. In one embodiment, the challenge generation engine 308 is a set of instructions executable by the processor 206 to provide the functionality described below for generating authentication challenges based at least in part on the account owner's social network activity information. In another embodiment, the challenge generation engine 308 is stored in the memory 208 of the user login server 101 and is accessible and executable by the processor 206. In either embodiment, the challenge generation engine 308 is adapted for cooperation and communication with the processor 206 and other components of the user login server 101 via bus 204 and network 105.

The challenge generation engine 308 receives the results of the social network activity information analysis engine 306, generates an authentication challenge based at least in part on the account owner's social network activity information, and sends the authentication challenge for display. In embodiments where the social network activity information analysis engine 306 identifies a plurality of patterns and/or social network activity information as potential bases for a user authentication challenge, the challenge generation engine 308 selects a basis from the plurality of potential bases according to one embodiment. In one embodiment, the selection is random. In one embodiment, the selection is based on which social network activity information generates the most secure authentication challenge. In another embodiment, the social network activity information analysis engine 306 selects the basis from the plurality of potential bases.

In some embodiments, the challenge generation engine 308 may generate a direct challenge. For example, "Who did you send a link to your Picasa album?" directly challenges the user's 125a/125b/125n knowledge of the account owner's cross-product sharing. In some embodiments, the challenge generation engine 308 may generate an indirect challenge. For example, "Why is 5-6 pm every day significant?" indirectly challenges the user's 125a/125b/125n knowledge of the account owner's daily messaging ritual. For another example, "What interests you?" indirectly challenges the user's 125a/125b/125n knowledge of the account owner's search history, which is the social network activity information in this example.

In one embodiment, the authentication challenge is close-ended and provides the user 125a/125b/125n with a finite number of possible answers to select from. For example, identifying the subject line of two e-mails the account owner manually marked-as-read out of a list of five e-mail subject lines. For another example, "True or False? I am more likely to tag a photograph than the average user." In other embodiments, the authentication challenge is open-ended. For example, the fill-in-the-blank: "On the first Sunday of month I buy _____," which challenges the user's 125a/125b/125n knowledge of a monthly transaction pattern. In some embodiments, more than one type of answer may be used in combination in an authentication challenge. For example, the challenge "In response to _____'s comment, I commented (a) 3 times; (b) 4 times; (c) 5 times; or (d) six times." uses both an open-ended fill-in-the-blank for the commenter's name and a close-ended multiple-choice for the number of responses.

In one embodiment, the authentication challenge response requires inclusion. For example, "Identify all of the following users that are members of your social graph," requires the user 125a/125b/125n to include users that are members of the account owner's social graph. In one embodiment, the authentication challenge response requires exclusion. For example, "Identify any of the following users that are not on your frequent contact list," requires the user 125a/125b/125n to exclude users that are not frequent contacts.

In some embodiments, the challenge generation engine 308 uses or maintains a database of wrong answers. For example, if the authentication challenge requires the user 125a/125b/125n to identify the subject lines of two messages the account owner has recently, manually marked-as-read out of a list of five, in one embodiment, the challenge generation engine 308 obtains the subject lines of two messages the account owner has recently, manually marked-as-read from the account owner's social network activity information on the storage device 214 and the three wrong subject lines from the database of wrong answers. In one embodiment, the database of wrong answers is stored on the storage device 214. In another embodiment, the database of wrong answers is stored in data storage 110. In yet another embodiment, the database of wrong answers is divided and stored between the storage device 214 and data store 110. In one embodiment, the database of wrong answers is made of personally unidentifiable data from the users 125a, 125b, 125n of the system 100.

In one embodiment, the challenge generation engine 308 generates an authentication challenge based on the account owner's social network activity information that is personally unidentifiable. In one embodiment, the challenge generation engine 308 generates an authentication challenge based on the account owner's social network activity information that is similar, or identical, to a wrong answer in the database.

The challenge assessment engine 310 is software and routines executable by the processor for determining whether a generated authentication challenge has been successfully completed. In one embodiment, the challenge assessment engine 310 is a set of instructions executable by the processor 206 to provide the functionality described below for determining whether a generated authentication challenge has been successfully completed. In another embodiment, the challenge assessment engine 310 is stored in the memory 208 of the user login server 101 and is accessible and executable by the processor 206. In either embodiment, the challenge assessment engine 310 is adapted for cooperation and communication with the processor 206 and other components of the user login server 101.

According to some embodiments, the challenge assessment engine 310 receives a response from the user 125a/125b/125n via user device 115a/115b/115n after the challenge generation engine 308 generates and sends the authentication challenge for display to the user 125a/125b/125n via the user device 115a/115b/115n. The challenge assessment engine 310 compares the response received from the user 125a/125b/125n with the account owner's social network activity information, and if there is a match, the authentication challenge is successfully completed and the login is allowed. In one embodiment, if the user 125a/125b/125n response does not match the account owner's social network activity information, the authentication challenge was not successfully completed and the user 125a/125b/125n is denied access. In one embodiment, if there is no match, a new authentication challenge is generated and sent. In one embodiment, the cycle of generating authentication challenges and determining the successfulness of completion is repeated until a challenge is successfully completed. In one embodiment, the cycle of generating authentication challenges and determining the successfulness of completion is repeated a limited number of times. In one such embodiment, a warning is sent after the limited number of times is reached. In another such embodiment, the account attempting to be accessed is locked once the limited number is reached. In one embodiment, the limited number is three.

Figure 5:
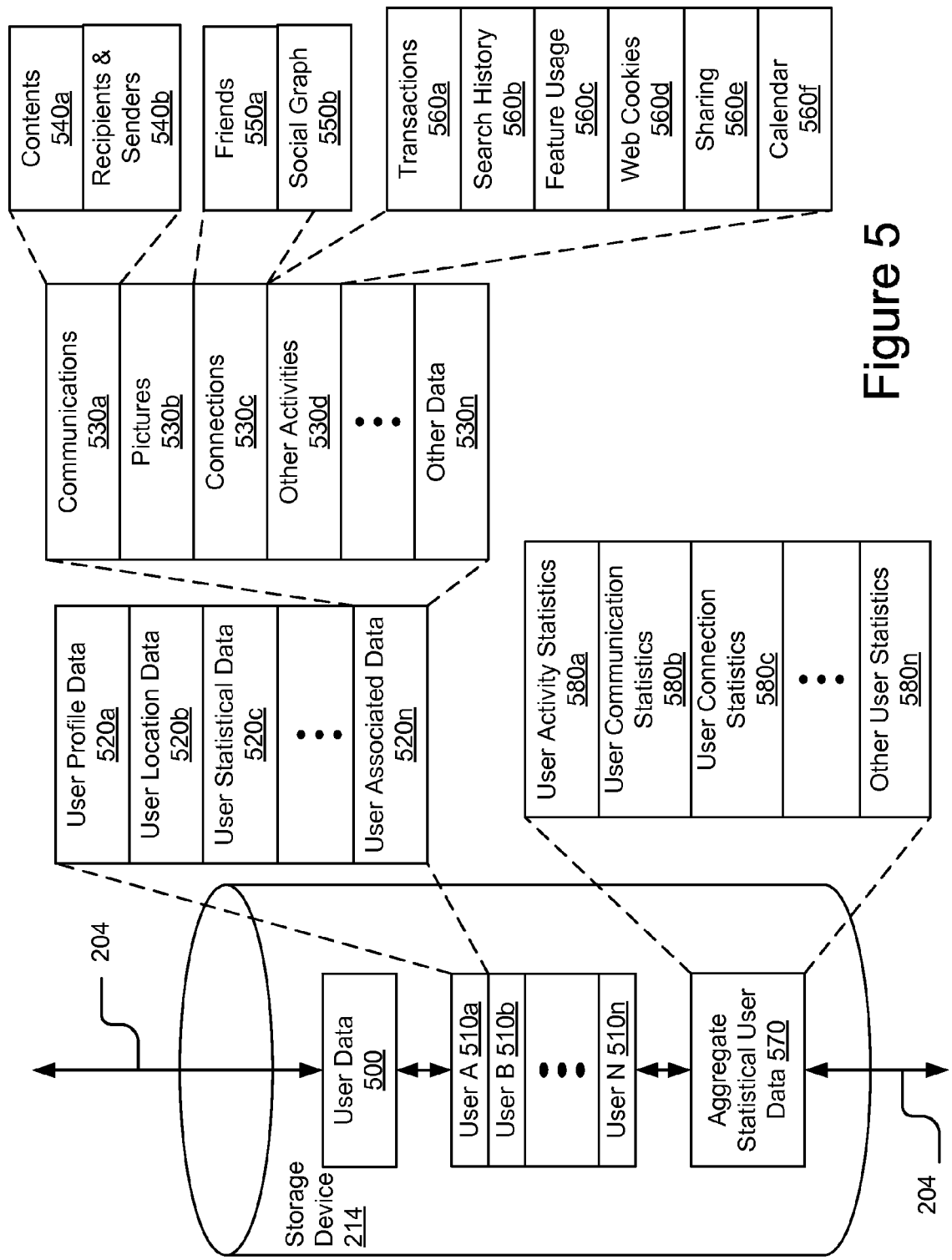
FIG. 5 is a block diagram illustrating a storage device storing sets of data and information associated with users in the system, including the account owners' social network activity information according to one embodiment.

FIG. 5 illustrates an example of a storage device 214 storing user data 500 including data belonging to User A 510a. In this example, User A's data 510a includes data for the User A's profile 520a, location 520b, preferences 520c, as well as other data 520n associated with User A. In one embodiment, the data associated with User A 520n includes data regarding User A's communications 530a, connections 530c, and other activities 530d, in addition to pictures 530b and other data 530n. In one embodiment, the user associated data 520n is, or includes, User A's social network activity information. The communication data 530a contains data concerning the contents 540a as well as the recipients and senders 540b of the communications according to one embodiment. The connections data 530c includes data regarding the user's friends 550a and social graph 550b according to one embodiment. The activities data 530d includes data regarding the user's transactions 560a, search history 560b, feature usage 560c, web cookies 560d, sharing habits 560e, and calendar 560f information according to one embodiment. In this example embodiment, the storage device 214 also stores statistical data in the form of aggregate statistics 570 for the system's users and statistics associated with each individual user 520c. In one embodiment, the storage device also includes a database of wrong answers (not shown).

Process

Figure 4:
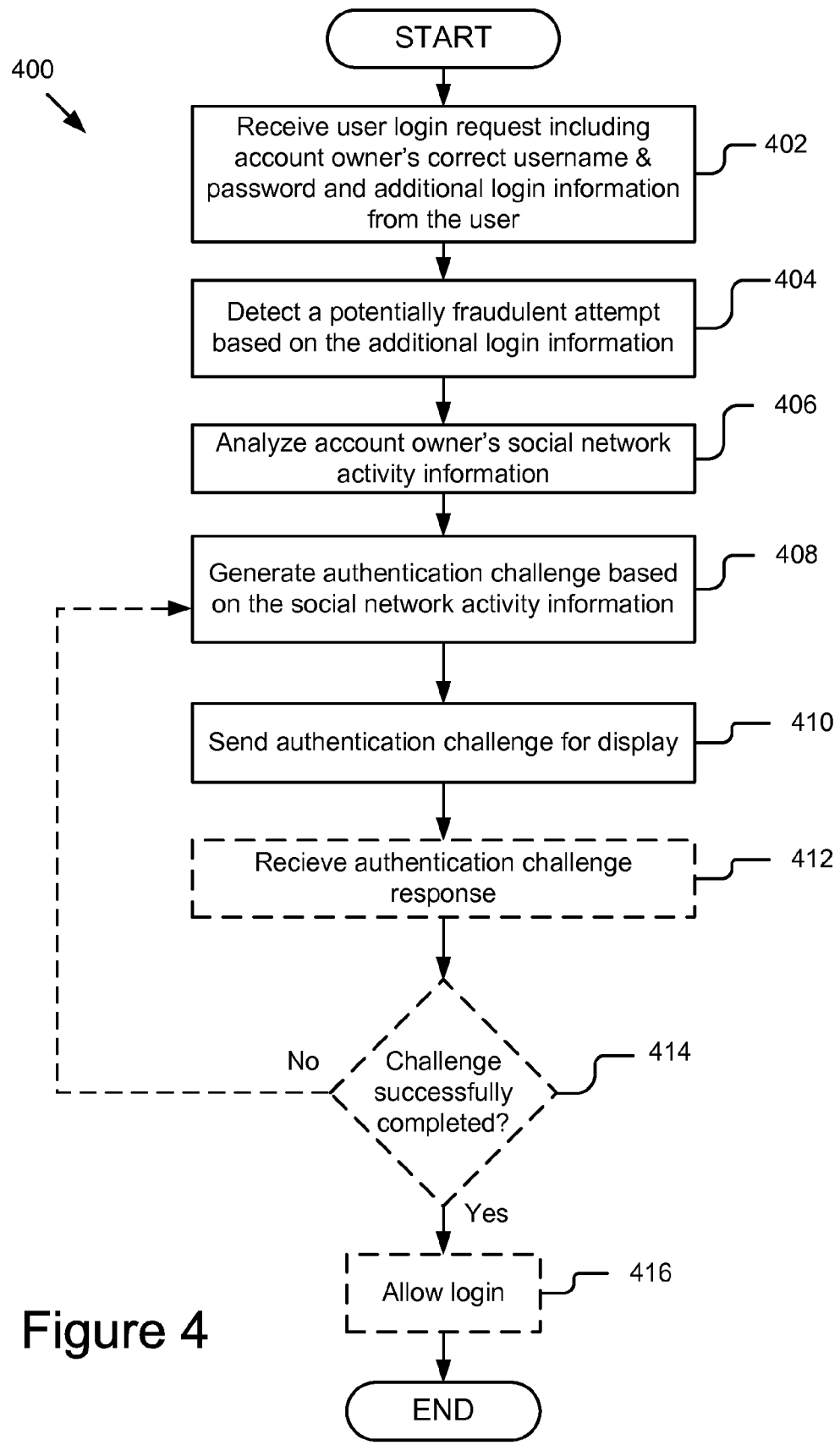
FIG. 4 is a flow chart illustrating a method for generating user authentication challenges based at least in part on the account owner's social network activity information in response to detecting a potentially fraudulent login attempt according to one embodiment.

Referring now to FIG. 4, a flow chart illustrating an embodiment of a method 400 for generating an authentication challenges based at least in part on the account owner's social network activity information is shown. The method 400 begins when the login receiver engine 302 of the authentication module 220a receives 402 a login request from a user, the login request including an account owner's correct username and password as well as additional login information from the user. The fraudulent login detection engine 304 of the authentication module 220a detects 404 a potentially fraudulent login attempt based on the additional login information in the login request. As mentioned above, examples of additional login information include, but are not limited to, the IP address of the computer from which the login request is coming, the device identification number of the device being used, and/or the location of the computer from which the login request is coming, including the state and/or country, and browser cookies. The social network activity information analysis engine 306 analyzes 406 the account owner's social network activity information. As discussed above, various forms of analysis exist, including, but not limited to, statistical analysis and analysis to determine what social network activity information is the most secure basis for generating an authentication challenge.

Turning to FIG. 7, a flow chart illustrating one method 700 performed by the social network activity information analysis engine 306 of the authentication module 220a for analyzing the account owner's social network activity information is shown. According to one embodiment, the account owner's social network activity information is analyzed 702 for patterns. In one embodiment, the presence of a pattern is determined by using 704 statistical analysis. As discussed above, in some embodiments, the statistical analysis may utilize statistics regarding the account owner's social network activity information, aggregate statistics regarding users 125a, 125b, 125, or both. In one embodiment, a determination 706 is made whether the social network activity information contains a pattern. If it is determined that the social network activity information does not contain a pattern (706—No), in one embodiment, the social network activity information is not used to generate an authentication challenge.

In one embodiment, if the social network security information contains a pattern (706—Yes), the social network activity information is analyzed 710 for deviations from the pattern. As discussed above, deviations from the pattern are identified 712 statistical outliers. If it is determined 714 that there are no deviations from the pattern (714—No), in one embodiment, 716 the pattern is a potential basis for an authentication challenge. However, if it is determined 714 that there is a deviation from the pattern (714—No), in one embodiment, 718 both the pattern and the deviation are potential bases for an authentication challenge. In one embodiment, where a plurality of potential bases exists, whether 716 patterns or 718 patterns and deviations, one or more patterns and/or deviations are randomly selected 720 to be used as the basis for an authentication challenge.

Turning to FIG. 8, a flow chart illustrating another method 800 performed by the social network activity information analysis engine 306 of the authentication module 220a for analyzing the account owner's social network activity information is shown. According to one embodiment, after a pattern, a deviation from a pattern, or both has been determined 802, by the method of FIG. 7 or some other method, the security of the social network activity information underlying the pattern and/or deviation is analyzed 802 and determined 804. In one embodiment, the security analysis 802 includes analyzing 806 whether the social network activity information is viewable or searchable by the public. As discussed above, in one embodiment, social network activity information that is publicly searchable or viewable is not considered a secure basis for an authentication challenge (810—No). For example, the identity individuals in the account owner's social graph, in one embodiment, are not a secure basis for an authentication challenge (810—No) if the account owner's social graph can be viewed by the public. In one embodiment, the security analysis 804 includes analyzing 808 whether the social network activity information is personally unidentifiable. As discussed above, in one embodiment, if the social network activity information is personally unidentifiable it is considered secure (810—Yes). For example, in one embodiment, the subject line of a message, which occurs in over a thousand user accounts is personally unidentifiable; therefore, that subject line is a secure basis for an authentication challenge (810—Yes). In one embodiment, if the social network activity is not a secure basis for an authentication challenge (810—No), the social network activity information is 816 not a potential basis for an authentication challenge.

In one embodiment, if the social network activity information is a secure basis for an authentication challenge (810—Yes), then it is 812 a potential basis for an authentication challenge. In one embodiment, a plurality of social network activity information is 812 a potential basis for an authentication challenge and one or more social network information is selected as the basis of an authentication challenge from those potential bases. As discussed above, the selection could be the social network activity information that generates the most secure authentication challenge or a random selection.

Returning to FIG. 4, the challenge generation engine 308 generates 408 an authentication challenge based at least in part on the account owner's social network activity information and sends 410 the authentication challenge for display. As discussed above, the challenge generated 408 can take many forms including, but not limited to, direct or indirect; close-ended or open-ended or a combination thereof; inclusive or exclusive. In one embodiment, the challenge generation engine 308 uses or maintains a database of wrong answers. In one embodiment, the data base of wrong answers is used to provide the incorrect options when generating 408 a close-ended challenge. In one embodiment, the wrong answers in the database are personally unidentifiable social network activity information from users 125a, 125b, 125n.

As discussed above, in one embodiment, the challenge generation engine 308 generates 408 an authentication challenge based on the account owner's social network activity information that is personally unidentifiable. As discussed above, the challenge generation engine 308, in one embodiment, generates 408 an authentication challenge based on the account owner's social network activity information that is similar, or identical, to a wrong answer in the database.

The illustrated embodiment of the method includes the optional challenge assessment engine 310 of the authentication module 220a, which receives 412 a response from the user 125a/125b/125n and determines 414 whether the generated challenge was completed successfully. If the challenge was completed successfully (414—Yes), the login is allowed 416. In some embodiments, if the generated challenge was not completed successfully (414—No), another authentication challenge is generated 408. In some embodiments, this cycle of generating 408 an authentication challenge through determination 414 of successful completion is repeated until the challenge is successfully completed (414—Yes). In other embodiments, this cycle of generating 408 and determination 414 of successful completion is repeated for a limited number of times and after the limit is reached, a warning is sent for display (not shown). In other embodiments, this cycle of generating 408 and determination 414 of successful completion is repeated for a limited number of times, and after the limit is reached, the account is locked (not shown). In some embodiments, this cycle of generating 408 and determination 414 of successful completion is repeated three times, then after the third unsuccessful attempt, a warning is sent for display (not shown). In one embodiment, after the third unsuccessful attempt the user's 125a account is locked (not shown).

Example Graphical User Interface

Figure 6:
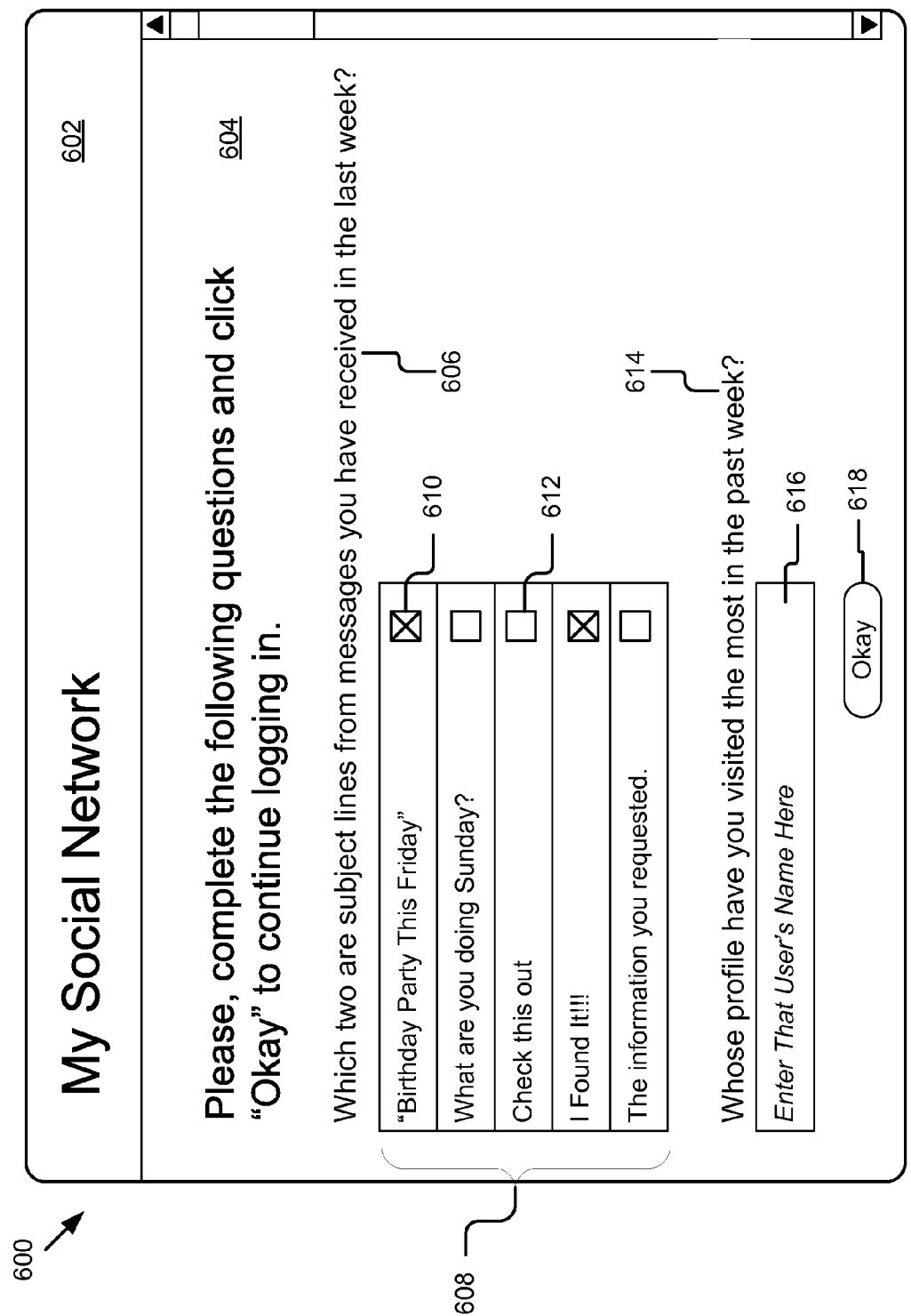
FIG. 6 is a graphic representation of an example of a user interface displaying an authentication challenge based at least in part on the account owner's social network activity information according to one embodiment.

FIG. 6 is a graphical representation of an example of a user interface 600 displaying a social network page 602 containing an authentication challenge 604 based on at least in part on the account owner's social network activity information according to one embodiment. In the illustrated embodiment, the authentication challenge 604 utilizes a close-ended challenge in the form of a multiple choice question 606, wherein question 606 is based on social network activity information regarding the subject lines from messages the account owner received in the last week. The challenge is "close-ended" because there are a finite number of potential answers 608, in illustrated embodiment there are five potential answers provided to the user. Each of the potential answers 608 is associated with a box 612, which may be checked 610 in order to select that answer according to one embodiment. In the illustrated embodiment, the authentication challenge 604 also uses an open-ended fill-in-the-blank question 614, wherein question 614 is based on social network activity information regarding what user profile the account owner has visited most frequently in the past week. The challenge is "open-ended" because potential answers are not provided for the user to select from and possible answers are nearly limitless for a fill-in-the-blank. The user is prompted to input an answer in the box 616 in one embodiment. Once the user has answered the authentication challenge questions, the user clicks the "Okay" button 618 to complete the authentication challenge according to one embodiment. In one embodiment, the completed authentication challenge is assessed, if the user's answers are correct, the challenge is successfully completed and login is allowed.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims of this application. As will be understood by those familiar with the art, the embodiments may take other specific forms without departing from the spirit or essential characteristics thereof. Likewise, the particular naming and division of the modules, routines, features, attributes, methodologies and other aspects are not mandatory or significant, and the mechanisms that implement one embodiment or its features may have different names, divisions and/or formats. Furthermore, as will be apparent to one of ordinary skill in the relevant art, the modules, routines, features, attributes, methodologies and other aspects of the embodiments can be implemented as software, hardware, firmware or any combination of the three. Also, wherever a component, an example of which is a module, of the embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the embodiments are in no way limited to implementation in any specific programming language, or for any specific operating system or environment. Accordingly, the disclosure is intended to be illustrative, but not limiting, of the scope, which is set forth in the following claims.

The foregoing data/information is collected upon user consent. In some implementations, a user is prompted to explicitly allow data collection. Further, the user may opt in/out of participating in such data collection activities.

What is claimed is:

1. A computer-implemented method for generating user authentication challenges performed on one or more computing devices, the method comprising:
    receiving, on the one or more computing devices, a login request from a user wherein the login request includes an account owner's correct username and password and additional login information from the user;
    in response to receiving the login request, detecting a potential fraudulent login attempt based on the additional login information from the user;
    analyzing social network activity information of the account owner, wherein the analysis includes determining a pattern of social network activity and a deviation from the pattern of social network activity;
    performing security analysis of the social network activity information underlying including the pattern and the deviation from the pattern to determine whether the underlying social network activity information is a secure basis for an authentication challenge;
    in response to determining the social network activity information as the secure basis for the authentication challenge, generating the authentication challenge based at least in part on the social network activity information and the deviation from the pattern of social network activity; and
    sending the authentication challenge for display;
    wherein the underlying social network information is a secure basis for the authentication challenge when the underlying social network activity is not publicly available and not personally identifiable, the authentication challenge generated is based at least in part on personally unidentifiable social network activity information.

2. The computer-implemented method of claim 1, further comprising:
    receiving a response from the user; and
    assessing completion of the authentication challenge based on the response from the user.

3. The computer-implemented method of claim 1, wherein the authentication challenge is based at least in part on social network activity information selected at random.

4. The computer-implemented method of claim 1, wherein the authentication challenge includes an inquiry regarding the social network activity information of the account owner.

5. The computer-implemented method of claim 1, wherein the additional login information includes an IP address or a device identification number of the device of the user.

6. The computer-implemented method of claim 1, wherein the additional login information includes a geographic location of the user.

7. The computer-implemented method of claim 1, wherein the social network activity information is analyzed using statistical data regarding the account owner or other users.

8. The computer-implemented method of claim 1, wherein the social network activity information is analyzed for memorability or security; and the authentication challenge generated is based at least in part on social network activity information that is determined to be memorable or secure.

9. The computer-implemented method of claim 1, wherein the authentication challenge generated is based at least in part on social network activity information determined to be the most memorable or most secure.

10. The computer-implemented method of claim 1, wherein the security analysis includes analyzing whether the social network activity information is viewable or searchable by the public.

11. The computer-implemented method of claim 1, wherein the security analysis includes analyzing whether the underlying social network activity information is personally unidentifiable and whether the underlying social network activity is publicly available, the underlying social network information is a secure basis for the authentication challenge when the underlying social network activity is not publicly available and not personally identifiable.

12. The computer-implemented method of claim 2, further comprising:
   generating a new authentication challenge if the user fails to complete the first authentication challenge;
   sending the new authentication challenge to the user;
   receiving a new response from the user; and
   assessing the completion of the new authentication challenge based on the new response.

13. A system for generating user authentication challenges, the system comprising:
   one or more processors;
   a login receiver engine stored on a memory and executable by the one or more processors for receiving a login request, wherein the login request includes an account owner's correct username and password and additional login information from a user;
   a fraudulent login detection engine stored on a memory and executable by the one or more processors for detecting a potentially fraudulent login attempt based on the additional login information from the user;
   a social network activity information analysis engine stored on a memory and executable by the one or more processors for analyzing the social network activity information of the account owner including determining a pattern of social network activity and a deviation from the pattern of social network activity, and performing security analysis of the social network activity information underlying the pattern and the deviation from the pattern to determine whether the underlying social network activity information is a secure basis for an authentication challenge; and
   a challenge generation engine stored on a memory and executable by the one or more processors for generating an authentication challenge based at least in part on the social network activity information that is determined as the secure basis for the authentication challenge and the deviation from the pattern of social network activity and sending the authentication challenge for display;
   wherein the underlying social network information is a secure basis for the authentication challenge when the underlying social network activity is not publicly available and not personally identifiable, the authentication challenge generated by the challenge generation engine is based at least in part on personally unidentifiable social network activity information.

14. The system of claim 13, further comprising:
   a challenge assessment engine for receiving a response from the user and assessing completion of the authentication challenge based on the response from the user.

15. The system of claim 13, wherein the authentication challenge generated by the challenge generation engine is based at least in part on social network activity information selected at random.

16. The system of claim 13, wherein the authentication challenge generated by the challenge generation engine includes an inquiry regarding the social network activity information of the account owner.

17. The system of claim 13, wherein the additional login information used by the fraudulent login detection engine includes an IP address or a device identification number of the device of the user.

18. The system of claim 13, wherein the additional login information used by the fraudulent login detection engine includes a geographic location of the user.

19. The system of claim 13, wherein the social network activity information is analyzed by the social network activity information analysis engine using statistical data regarding the account owner or other users.

20. The system of claim 13, wherein the social network activity information is analyzed by the social network activity information analysis engine for memorability or security; and the authentication challenge generated by the generation engine is based at least in part on social network activity information determined to be memorable or secure.

21. The system of claim 13, wherein the authentication challenge generated by the challenge generation engine is based at least in part on social network activity information determined to be the most memorable or most secure by the social network activity information analysis engine.

22. The system of claim 13, wherein the additional login information used by the fraudulent login detection engine includes the user's IP address, geographic location, or device identification number.

23. The system of claim 14, wherein the challenge generation engine generates a new authentication challenge, if the challenge assessment engine determines that the user failed to complete the first authentication challenge, and sends the new authentication challenge to the user, after which the challenge assessment engine receives a user's response to the new authentication challenge and assesses the completion of the new authentication challenge based on the user's response to the new authentication challenge.

24. An apparatus comprising a non-transitory computer readable medium encoding instructions thereon that in response to execution by a computing device cause the computing device to perform operations comprising:
   receiving a login request from a user wherein the login request includes an account owner's correct username and password and additional login information from the user;
   in response to receiving the login request, detecting a potential fraudulent login attempt based on the additional login information from the user;
   analyzing social network activity information of the account owner, wherein the analysis includes determining a pattern of social network activity and a deviation from the pattern of social network activity;
   performing security analysis of the social network activity information underlying including the pattern and the deviation from the pattern to determine whether the underlying social network activity information is a secure basis for an authentication challenge;
   in response to determining the social network activity information as the secure basis for the authentication challenge, generating the authentication challenge based at least in part on the social network activity information and the deviation from the pattern of social network activity; and sending the authentication challenge for display;

wherein the underlying social network information is a secure basis for the authentication challenge when the underlying social network activity is not publicly available and not personally identifiable, and generating the authentication challenge based at least in part on personally unidentifiable social network activity information.

25. The apparatus of claim 24, wherein the authentication challenge includes an inquiry regarding the social network activity information of the account owner.

26. The apparatus of claim 24, wherein the additional login information includes an IP address or a device identification number of the device of the user.

* * * * *